(12) United States Patent
Kawara (10) Patent No.: US 9,307,100 B2
(45) Date of Patent: Apr. 5, 2016

(54) INFORMATION PROCESSING APPARATUS, INFORMATION PROCESSING SYSTEM, CONTROL METHODS THEREOF, AND STORAGE MEDIUM

(71) Applicant: CANON KABUSHIKI KAISHA, Tokyo (JP)

(72) Inventor: Satoshi Kawara, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/073,403

(22) Filed: Nov. 6, 2013

(65) Prior Publication Data

US 2014/0146355 A1    May 29, 2014

(30) Foreign Application Priority Data

Nov. 29, 2012    (JP) ................. 2012-261622

(51) Int. Cl.
| | |
|---|---|
| H04N 1/00 | (2006.01) |
| G06F 3/12 | (2006.01) |
| G06Q 10/10 | (2012.01) |
| H04N 1/32 | (2006.01) |

(52) U.S. Cl.
CPC ............ *H04N 1/00233* (2013.01); *G06F 3/122* (2013.01); *G06F 3/1205* (2013.01); *G06F 3/1226* (2013.01); *G06F 3/1267* (2013.01); *G06F 3/1268* (2013.01); *G06F 3/1287* (2013.01); *G06F 3/1288* (2013.01); *G06Q 10/10* (2013.01); *H04N 1/00244* (2013.01); *H04N 1/32128* (2013.01); *G06F 3/1228* (2013.01); *H04N 2201/0094* (2013.01); *H04N 2201/3205* (2013.01); *H04N 2201/3225* (2013.01); *H04N 2201/3266* (2013.01); *H04N 2201/3273* (2013.01); *H04N 2201/3274* (2013.01)

(58) Field of Classification Search
USPC ........................................ 358/1.15
See application file for complete search history.

(56) References Cited

U.S. PATENT DOCUMENTS

| | | | |
|---|---|---|---|
| 8,208,162 B2 | 6/2012 | Kawara | |
| 2008/0013123 A1* | 1/2008 | Yoshioka | 358/1.15 |
| 2012/0154854 A1* | 6/2012 | Sato | 358/1.15 |
| 2014/0036287 A1* | 2/2014 | Byer et al. | 358/1.13 |
| 2014/0043630 A1* | 2/2014 | Buser et al. | 358/1.13 |

FOREIGN PATENT DOCUMENTS

JP    2001-159961 A    6/2001

* cited by examiner

*Primary Examiner* — Fan Zhang
(74) *Attorney, Agent, or Firm* — Fitzpatrick, Cella, Harper & Scinto (57) ABSTRACT

This invention provides a mechanism for printing or storing a file attached to a "message" or "comment" registered using the microblog function by a simple operation. To accomplish this, an information processing system or information processing apparatus controls to print data related to a managed message when a predetermined feedback operation for the managed message is detected.

14 Claims, 8 Drawing Sheets

INFORMATION PROCESSING APPARATUS, INFORMATION PROCESSING SYSTEM, CONTROL METHODS THEREOF, AND STORAGE MEDIUM

BACKGROUND OF THE INVENTION

1. Field of the Invention

The present invention relates to an information processing apparatus which uses a service provided by a server, an information processing system, control methods thereof, and a storage medium.

2. Description of the Related Art

In recent years, as a system form that provides services using the Internet, a cloud computing system is put into practical use. The user need only prepare for a minimum required connection environment without any hardware resources such as a server so as to use services provided by the cloud computing system, that is, so-called cloud services.

The cloud services include a service which provides a microblog function as a communication tool. The microblog function is a short blog function, which allows a user having an account in the service to publish short text of 100 to 200 letters, which is called "tweet", as a "message" or "comment". The user in this case includes, for example, a printer, cooperative service, and the like, that is, an object, application, and the like on the cloud service, and is not limited to an existing user (human). A unique identifier is assigned to each "message" or "comment" published by the user. In the microblog function, when the user registers a "message", a "timeline" which can register, display, and manage "comments" related to the registered "message" as a list is created. An electronic file can be appended to a "message" or "comment". For example, a character string "data for xxx" and electronic data as an entity of the data can be registered as a "message" or "comment".

On the other hand, image forming apparatuses represented by MFPs (Multi Function Printers) have gained advanced and multiple functions. In recent years, an image forming apparatus which incorporates not only basic functions such as a scan function and print function required to convert a paper document into electronic data and to print such data, but also a network interface (to be abbreviated as a network I/F hereinafter) has been developed. The image forming apparatus which incorporates the network I/F provides various solutions in cooperation with external systems and external services connected via a network. For example, the image forming apparatus which incorporates the network I/F stores print job data, and can execute print processing according to that print job data as needed. As a conventional print instruction method, for example, a method of displaying a job data list on a Web browser of a client, and pressing a URL of a print target job is available. Japanese Patent Laid-Open No. 2001-159961 has proposed a technique for temporarily converting print job data into print data and storing the print data in the image forming apparatus in advance, thereby increasing a print execution speed when printing is required.

However, the related art suffers problems to be described below. A case will be assumed wherein the user registers a file-attached "message" or "comment" using the microblog function in an environment in which tasks are carried out using the microblog function provided by the cloud service. At this time, when an attached file is to be printed using the image forming apparatus, the conventional technique is required to follow complicated procedures. That is, the attached file is downloaded and is opened using an application that can handle the attached file, and a printer driver is selected to issue a print instruction. On the other hand, when attached data is registered as a print job in advance, a simple print execution instruction can be issued by a remote print instruction. However, a case in which a print job is generated from a comment on the microblog function to execute print processing is not supported.

SUMMARY OF THE INVENTION

The present invention enables realization of a mechanism for printing or storing a file attached to a "message" or "comment" registered in a server by a simple operation.

One aspect of the present invention provides an information processing system comprising: a management unit configured to manage a message posted by a user; a detection unit configured to detect a predetermined feedback operation for the managed message; and a control unit configured to control to print data related to the managed message when the detection unit has detected the predetermined feedback operation.

Another aspect of the present invention provides an information processing apparatus configured to communicate with a server having a function of managing a message posted by a user, comprising: a detection unit configured to detect a predetermined feedback operation for the managed message; and a control unit configured to control to print data related to the managed message when the detection unit has detected the predetermined feedback operation.

Still another aspect of the present invention provides a control method of an information processing system, comprising: managing a message posted by a user; detecting a predetermined feedback operation for the managed message; and controlling to print data related to the managed message when the predetermined feedback operation has been detected in the detecting.

Yet still another aspect of the present invention provides a control method of an information processing apparatus configured to communicate with a server having a function of managing a message posted by a user, comprising: detecting a predetermined feedback operation for the managed message; and controlling to print data related to the managed message when the predetermined feedback operation has been detected in the detecting.

Still yet another aspect of the present invention provides a non-transitory computer-readable storage medium storing a computer program for controlling a computer to function as the information processing system.

Yet still another aspect of the present invention provides a non-transitory computer-readable storage medium storing a computer program for controlling a computer to function as the information processing apparatus.

Further features of the present invention will be apparent from the following description of exemplary embodiments with reference to the attached drawings.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

<Overall System Arrangement>

One embodiment of the present invention will be described hereinafter with reference to FIGS. 1 to 11. The overall arrangement of an information processing system 100 according to this embodiment will be described first with reference to FIG. 1. The information processing system 100 includes an image forming apparatus 101, terminal (operation terminal) 102, cloud service server A 131, and cloud service server B 132. To a LAN 110, the image forming apparatus 101 and terminal 102 are connected. The LAN 110 is connected to an Internet 120, and the cloud service server A 131 and cloud service server B 132, which provide services on the Internet 120, are connected via the Internet 120. Then, the terminal 102 can communicate with both the cloud service server A 131 and cloud service server B 132. In this case, the terminal 102 is connected to the LAN 110, but the present invention is not limited to this. The terminal 102 need only be connectable to the cloud service server A 131. Also, in this case, one image forming apparatus 101 is connected. Alternatively, a plurality of image forming apparatuses may be connected.

<Hardware Arrangement—Image Forming Apparatus>

Figure 1:
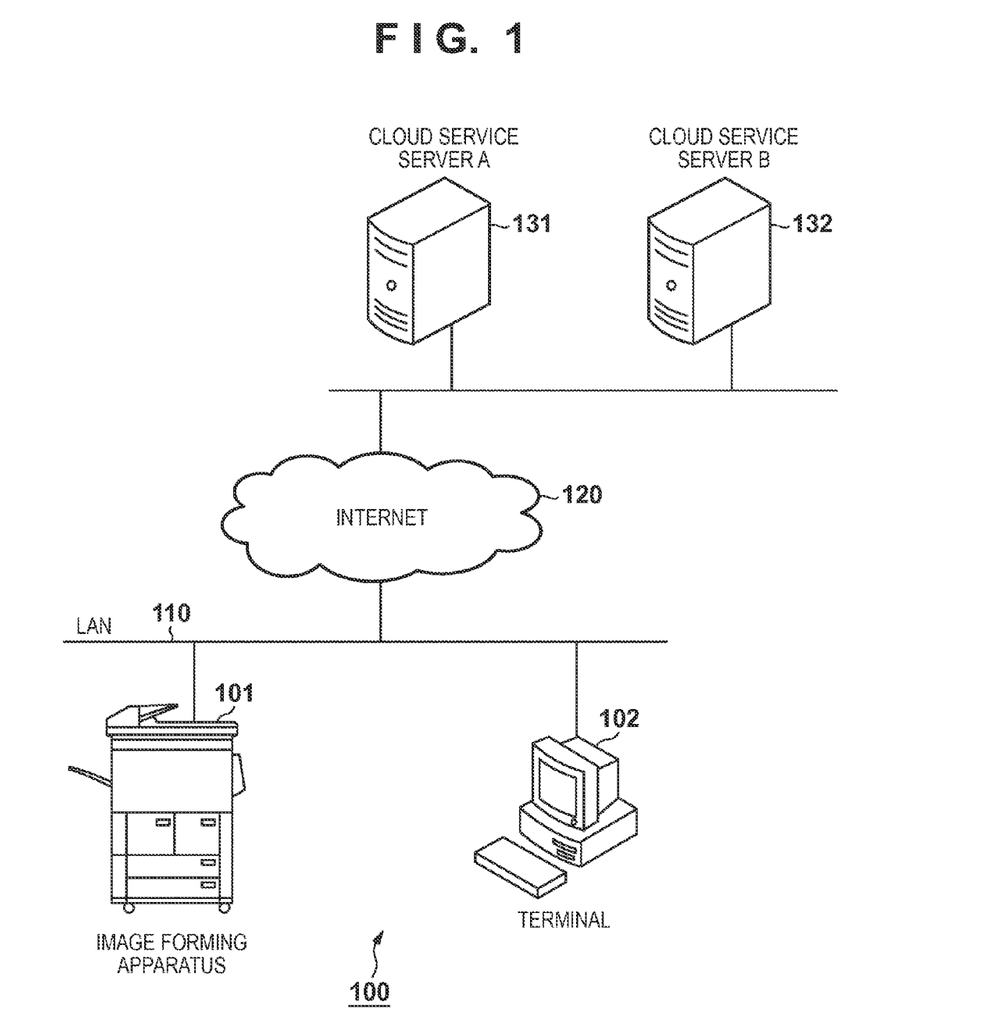
FIG. 1 is a view showing the overall arrangement of an information processing system 100.
Figure 2:
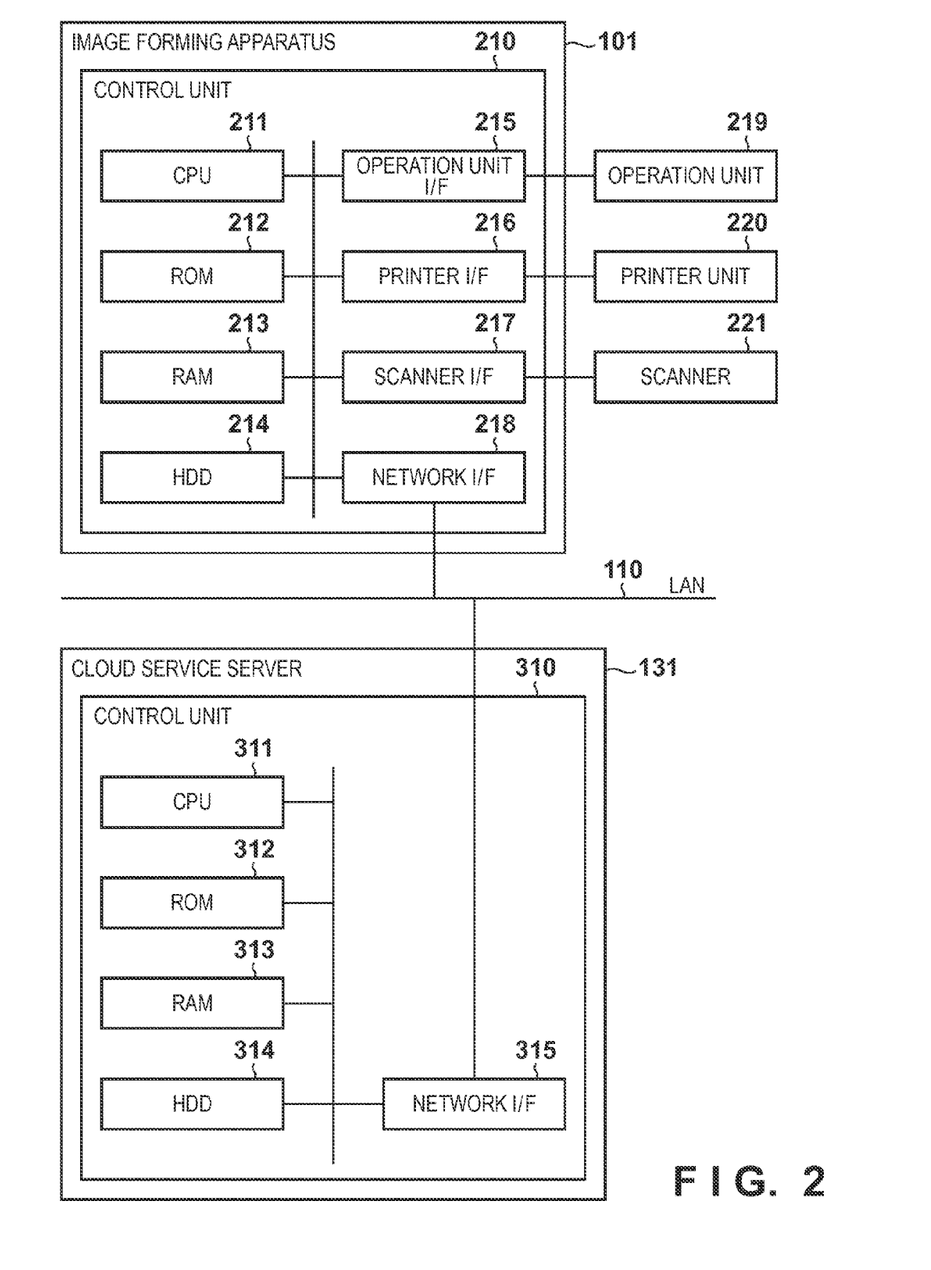
FIG. 2 is a block diagram showing the hardware arrangement of an image forming apparatus 101 and cloud service server.

The hardware arrangement of the image forming apparatus 101 and cloud service server A 131 will be described below with reference to FIG. 2. The arrangement of the image forming apparatus 101 will be described first. The image forming apparatus 101 includes a control unit 210, operation unit 219, printer 220, and scanner 221. The control unit 210 includes a CPU 211, ROM 212, RAM 213, HDD 214, operation unit I/F 215, printer I/F 216, scanner I/F 217, and network I/F 218. The control unit 210 including the CPU 211 controls the operation of the overall image forming apparatus 101. The CPU 211 reads out a control program stored in the ROM 212 to execute various kinds of control such as scan control and transmission control. The RAM 213 is used as temporary storage areas such as a main memory and work area of the CPU 211. The HDD 214 stores image data, various programs, or various information tables.

The operation unit I/F 215 connects the operation unit 219 and control unit 210. The operation unit 219 includes a liquid crystal display having a touch panel function, a keyboard, and the like, displays a screen, and can accept a user input. The printer I/F 216 connects the printer 220 and control unit 210. Image data to be printed by the printer 220 is transferred from the control unit 210 via the printer I/F 216, and is printed on a printing medium by the printer 220. The scanner I/F 217 connects the scanner 221 and control unit 210. The scanner 221 generates image data by reading an image on a document, and inputs the image data to the control unit 210 via the scanner I/F 217. The network I/F 218 connects the control unit 210 (image forming apparatus 101) to the LAN 110. The network I/F 218 transmits image data and information to external apparatuses (for example, the cloud service server A 131 and cloud service server B 132) on the LAN 110, and receives various kinds of information from the external apparatuses on the LAN 110.

The arrangement of the cloud service server A 131 as an information processing apparatus will be described below. Note that the cloud service server B 132 and terminal 102 also have the same arrangement, and a description thereof will not be given. The cloud service server A 131 includes a control unit 310. The control unit 310 includes a CPU 311, ROM 312, RAM 313, HDD 314, and network I/F 315. The control unit 310 including the CPU 311 controls the operation of the overall cloud service server A 131. The CPU 311 reads out a control program stored in the ROM 312 to execute various kinds of control processing. The RAM 313 is used as temporary storage areas such as a main memory and work area of the CPU 311. The HDD 314 stores image data, various programs, or various information tables (to be described later). The network I/F 315 connects the control unit 310 to the Internet 120. The network I/F 315 exchanges various kinds of information with other apparatuses on the LAN 110.

<Software Configuration—Image Forming Apparatus>

Figure 3:
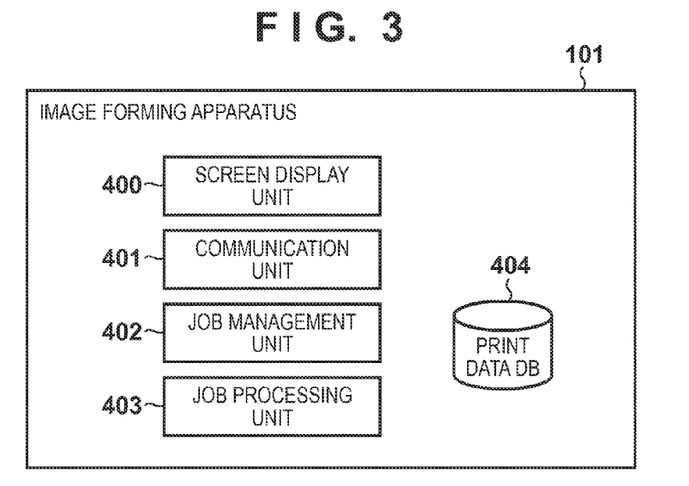
FIG. 3 is a diagram showing the software configuration of the image forming apparatus 101.

The software configuration of the image forming apparatus 101 will be described below with reference to FIG. 3. Respective function units shown in FIG. 3 are implemented when the CPU 211 included in the image forming apparatus 101 executes a control program. The image forming apparatus 101 includes a screen display unit 400, communication unit 401, job management unit 402, job processing unit 403, and print data database 404. Note that the print data database 404 will be abbreviated as the print data DB 404 hereinafter.

The screen display unit 400 displays a screen required to execute a print operation for the operation unit 219. Displayed contents include a list of print jobs stored in the print data DB 404. The user selects a job from this list, and inputs a print instruction. Upon reception of the print instruction, the screen display unit 400 issues an execution instruction of the print job to the job management unit 402.

Figure 6:
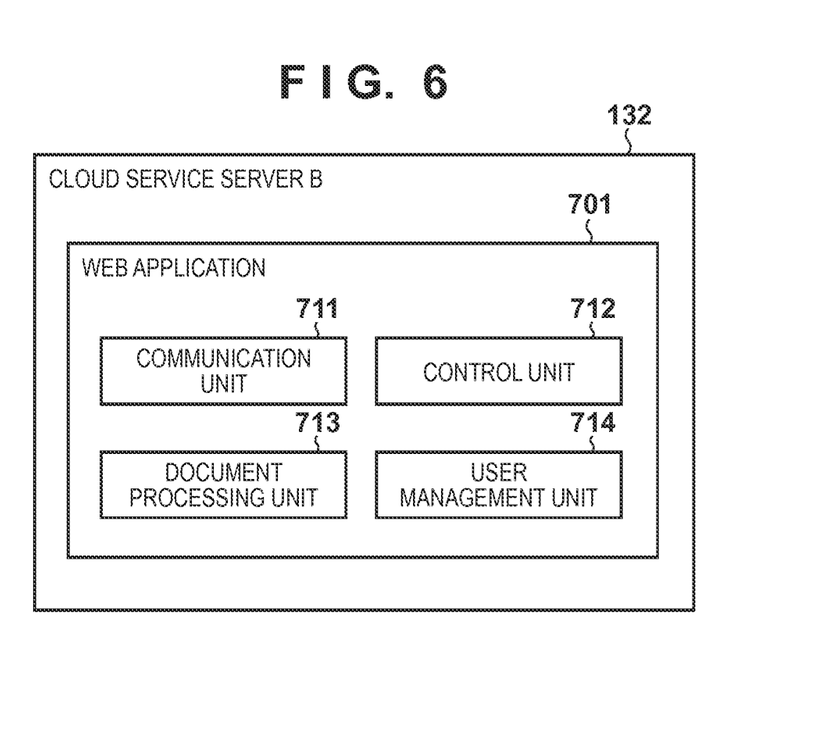
FIG. 6 is a diagram showing the software configuration of a cloud service server B 132.

The communication unit 401 transmits a request to a communication unit 711 of the cloud service server B 132 shown in FIG. 6 in accordance with an instruction from the job management unit 402. Also, the communication unit 401 receives a response (a reply to the request) from the communication unit 711. The contents of the transmitted request in this case include authentication processing and the like. The communication unit 401 receives print data, a print request, a DB storage request, an inquiry request of a processing status, and the like from the cloud service server B 132 (communication unit 711). Furthermore, the communication unit 401 issues a print instruction, DB storage instruction, and processing status confirmation instruction to the job management unit 402, and returns results as responses to the cloud service server B 132 (communication unit 711).

The job management unit 402 receives a print instruction from the screen display unit 400, and a print instruction, DB storage instruction, and the like from the communication unit 401, and outputs a print processing request and a job storage request in the print data DB 404 to the job processing unit 403. Also, in accordance with a processing status confirmation instruction, the job management unit 402 confirms whether or not the image forming apparatus 101 can execute print processing.

The job processing unit 403 requests the control unit 210 to execute print processing of print data in accordance with a print execution instruction from the job management unit 402, and the printer 220 consequently prints the print data on a printing medium. Also, the job processing unit 403 stores print data received from the communication unit 401 in the print data DB 404 in accordance with a DB storage instruction from the job management unit 402.

<Software Configuration—Cloud Service Server A>

Figure 4:
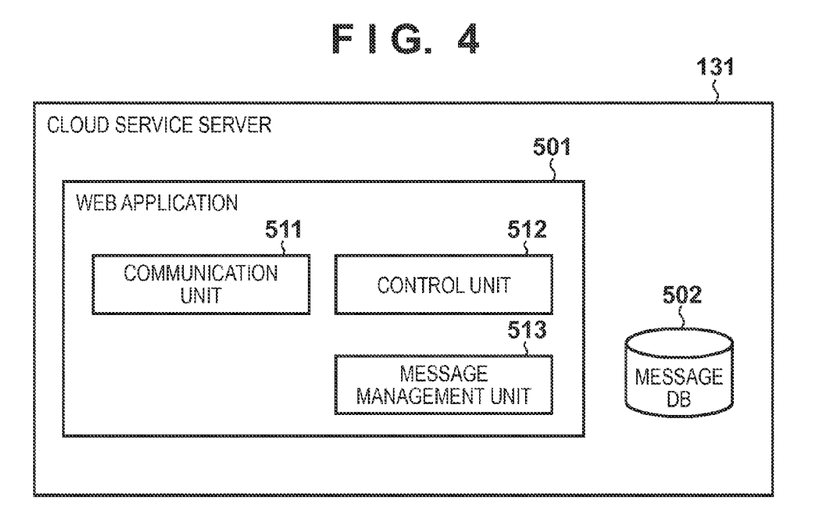
FIG. 4 is a diagram showing the software configuration of a cloud service server A 131.

The software configuration of the cloud service server A 131 will be described below with reference to FIG. 4. The cloud service server A 131 includes a Web application 501 and message DB 502. The Web application 501 includes a communication unit 511, control unit 512, and message management unit 513. Respective function units shown in FIG. 4 are implemented when the CPU 311 included in the cloud service server A 131 executes a control program.

The cloud service server A 131 includes the Web application 501 and message database 502 (to be abbreviated as the message DB 502 hereinafter). The Web application 501 provides a CRM (Customer Relationship Management) service for customer management and business support, and the like. Assume that in this embodiment, the Web application 501 provides the microblog function.

The communication unit 511 receives requests from the terminal 102 such as a PC, the cloud service server B 132, and the like, and transmits request contents to the control unit 512. Furthermore, the communication unit 511 receives responses as processing results of the requests from the control unit 512, and transmits the responses to the terminal 102 and cloud service server B 132.

The control unit 512 requests the respective function units to execute processing according to the request contents transmitted from the communication unit 511. When the request contents correspond to message/comment registration processing, the control unit 512 extracts a message or comment and a electronic file included in the request, and requests the message management unit 513 to execute registration processing of the message or comment. When the request contents correspond to electronic file download processing, the control unit 512 notifies the message management unit 513 of a message in which a electronic file to be downloaded is registered, and requests the message management unit 513 to execute download processing of the electronic file. On the other hand, when the request contents correspond to simple feedback for a comment (for example, pressing of a "like" button in Chatter), the control unit 512 requests the message management unit 513 to execute simple feedback registration processing.

The message management unit 513 registers, in the message DB 502, the contents of a message or comment, information of a registered user, and a electronic file when the electronic file is attached to a message in accordance with the comment registration request from the control unit 512. Upon registration of a message and comment in the message DB 502, the message management unit 513 assigns unique message IDs to the message and comment. Also, the message management unit 513 passes an electronic file to be downloaded to the control unit 512 in accordance with the download processing request from the control unit 512. Furthermore, the message management unit 513 registers simple feedback information (including, for example, a user and a message for which that user pressed "like") for a corresponding message in accordance with the simple feedback registration processing request from the control unit 512.

Note that since the control unit 512 designates a message ID when it transmits the download processing request, the message management unit 513 can specify an electronic file to be downloaded from the message DB 502. This mechanism will be described later with reference to FIG. 5.

<Message DB Configuration>

Figure 5:
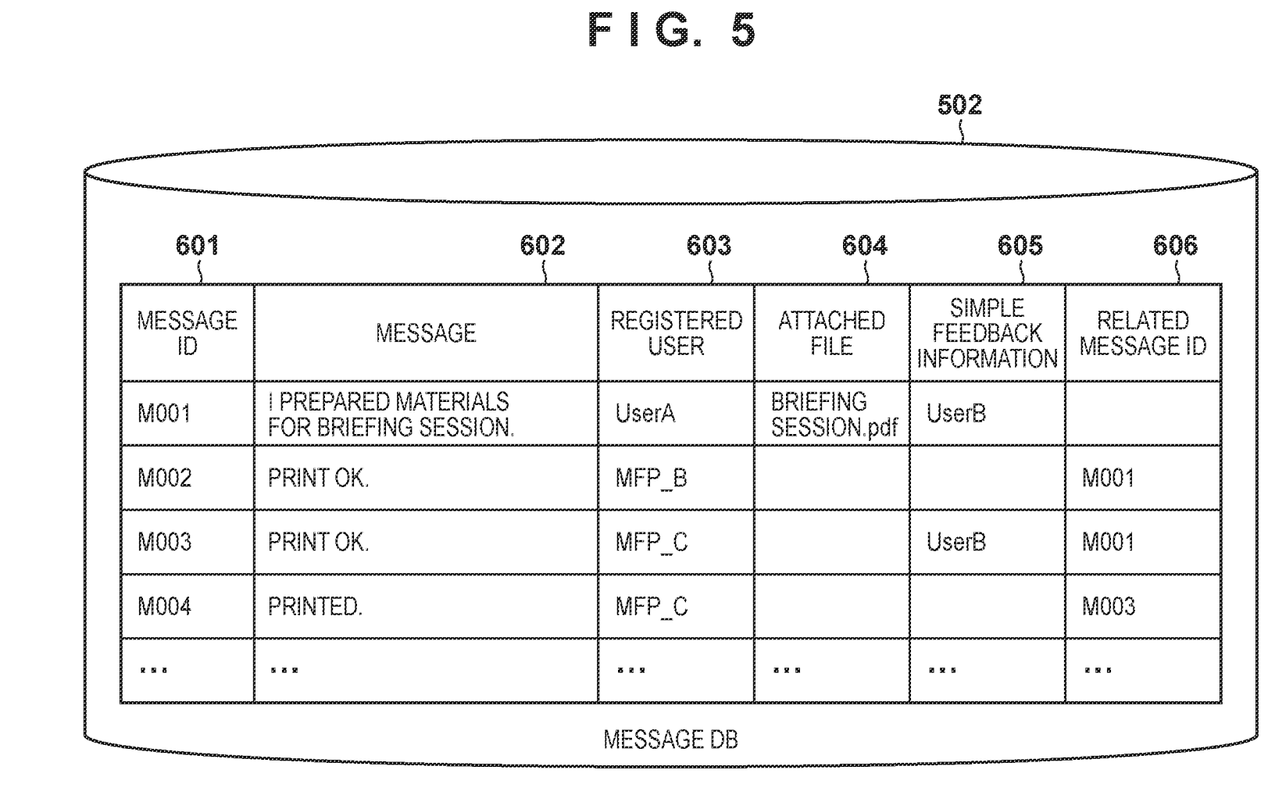
FIG. 5 shows the table configuration of a message DB 502.

The table configuration of the message DB 502 to which the present invention is applicable will be described below with reference to FIG. 5. Record data in a table shown in FIG. 5 are stored in a storage area such as the HDD 314 when the CPU 311 of the cloud service server A 131 executes a control program.

As described above, the message DB 502 is a database required to register and store a message or comment according to a request received by the control unit 512 of the Web application 501. A column 601 stores an identifier which is uniquely assigned to a message or comment registered in the message DB 502 by the message management unit 513. A column 602 stores a message, that is, a character string indicating contents of a message or comment included in a request received by the control unit 512. A column 603 stores information of a registered user, and indicates a user name who transmitted a request. That is, the registered user 603 means a user who created a message or comment.

A column 604 stores an attached file, that is an entity of an electronic file attached to a request received by the control unit 512. When no file is attached to a request received by the control unit 512, no electronic file is registered in the attached file 604. FIG. 5 shows that only a message having the message ID 601="M001" is attached with a file. A column 605 stores a user name who made simple feedback. That is, this column stores a user name (a user who pressed a "like" button in Chatter) included in a request (simple feedback registration processing request) received from the control unit 512. A column 606 stores a related message ID. When data included in a request is a comment for a message A, the message management unit 513 registers a message ID of the message A in this column. With the related message ID 606, a relevance between a message and comment can be managed.

<Software Configuration—Cloud Service Server B>

The software configuration of the cloud service server B 132 will be described below with reference to FIG. 6. The cloud service server B 132 includes a Web application 701. The Web application 701 includes a communication unit 711, control unit 712, document processing unit 713, and user management unit 714. Respective function units shown in FIG. 6 are implemented when the CPU 311 of the cloud service server B 132 executes a control program.

The Web application 701 communicates with both of the image forming apparatus 101 and cloud service server A 131 via the communication unit 711. The image forming apparatus 101 can use the functions of the cloud service server A 131 via the cloud service server B 132.

The control unit 712 executes various kinds of processing by controlling the communication unit 711, document processing unit 713, and user management unit 714. The control unit 712 receives requests from the image forming apparatus 101, terminal 102, and cloud service server A 131 via the communication unit 711, and controls to execute various kinds of processing. For example, when a request is an authentication processing request, the control unit 712 passes authentication information received from the image forming apparatus 101 to the user management unit 714, and controls the user management unit 714 to execute authentication processing.

Also, the control unit 712 has a function of transmitting a request as a status inquiry about, for example, a printable state, to the image forming apparatus 101, and a print request of a electronic file (or a storage request in the image forming apparatus 101) to the image forming apparatus 101 via the communication unit 711. Then, the control unit 712 can confirm an operation state of the image forming apparatus 101, and can issue a print execution instruction. Note that upon transmission of a print request (or a storage request in the image forming apparatus 101), the control unit 712 passes electronic data downloaded from the cloud service server A 131 to the document processing unit 713, and controls the document processing unit 713 to execute processing for converting that electronic data into a data format that can be processed by the image forming apparatus 101. Then, the control unit 712 transmits a request including the converted data to the image forming apparatus 101 via the communication unit 711.

Furthermore, the control unit 712 has a function of controlling to transmit a comment registration processing request to the cloud service server A 131, and a function of monitoring the microblog function of the cloud service server A 131 via the communication unit 711. With this function, the control unit 712 monitors the microblog function on the cloud service server A 131, and can request to register a comment in a microblog about an operation state of the image forming apparatus 101 upon pressing of a simple feedback button ("like" button in Chatter) for a comment.

The user management unit 714 manages user information, executes authentication processing based on authentication information acquired via the communication unit 711 and user information in accordance with an instruction received from the control unit 712, and notifies the control unit 712 of the result. The document processing unit 713 converts electronic data acquired via the communication unit 711 into PDL data in accordance with an instruction received from the control unit 712. Note that in this example, one cloud service server B 132 provides a management service (authentication processing and document processing). However, the present invention is not limited to this, and as another aspect of the cloud service server B 132, respective functions may be configured by a plurality of servers, and a plurality of virtual machines may be launched in these servers to execute distributed processing. In this case, a technique called "scale-out" (cloud computing) for increasing the number of virtual machines according to a predetermined condition is used.

<User Information>

Figure 7:
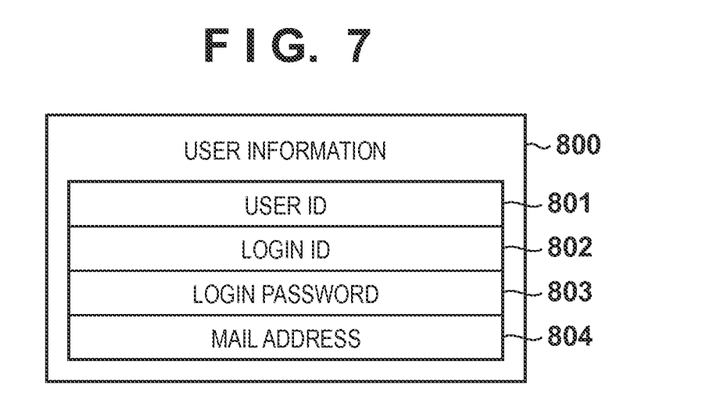
FIG. 7 is a view showing user information managed by a user management unit 714.

User information managed by the user management unit 714 will be described below with reference to FIG. 7. FIG. 7 shows a format of a data file used to store user information to be managed by the user management unit 714. In user information 800, a user ID 801 used to uniquely identify a user, a login ID 802 required to log in to the cloud service server B 132, a login password 803 required to log in, and a mail address 804 are managed in association with each other. The number of pieces of user information 800 matches the numbers of users registered in the user management unit 714.

<Microblog Function>

Figure 8:
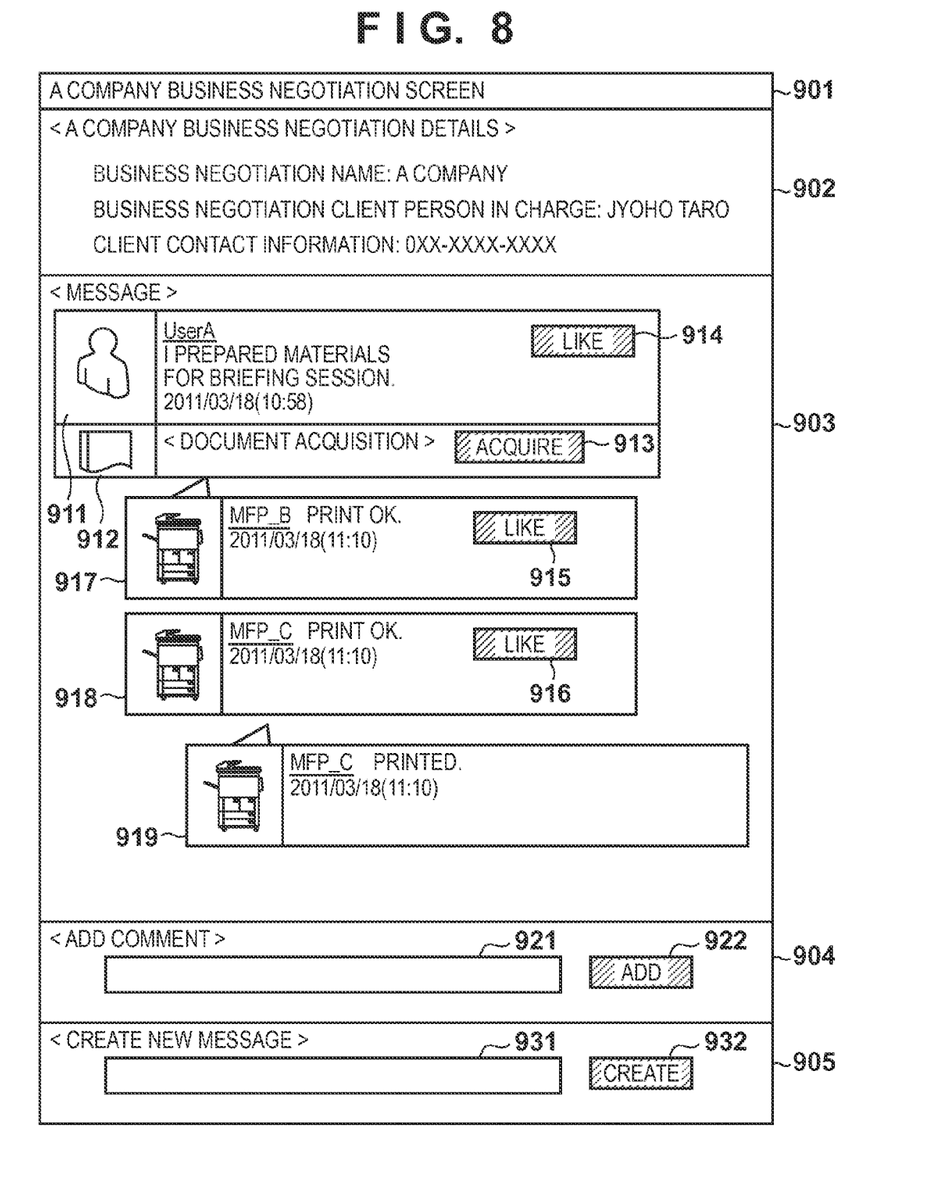
FIG. 8 is a view for explaining the microblog function.

The microblog function provided by the cloud service server A 131 to which the present invention is applicable will be described below with reference to FIG. 8. FIG. 8 shows a display example of a Web page to be displayed when the user accesses from a Web browser that runs on the terminal 102 such as a PC to the cloud service server A 131. This Web page is generated by the cloud service server A 131. Assume that the cloud service server A 131 manages business information which is currently in progress for the sales support purpose.

Reference numeral 901 denotes an A company business negotiation screen (predetermined screen) which displays information related to a business negotiation with A company. Reference numeral 902 denotes a detailed business negotiation area which displays a business negotiation name, client person in charge, client contact information, and the like as detailed information related to the business negotiation. Reference numeral 903 denotes a message display area, which displays a timeline including a message and comments for that message. The message display area 903 shows a state in which the user A registers a message 911 "I prepared materials for the briefing session" and a electronic file 912.

Reference numerals 917 and 918 denote comments for the message 911. The comment 917 displays a state in which an MFP_B replies "print OK" to the message 911. Likewise, the comment 918 displays a state in which an MFP_C replies "print OK" to the message 911. Furthermore, reference numeral 919 denotes a comment for the comment 918, which displays a state in which the MFP_C replies "printed" for the comment 918. Reference numerals 914, 915, and 916 denote simple feedback buttons displayed for each message/comment. Upon pressing this button, the user can make simple feedback to a message or comment. Note that FIG. 8 will explain an example in which simple feedback is attained using a "like" button. However, the present invention is not limited to a button shape, and other shapes may be used as long as an object included in the screen shown in FIG. 8 is used. For example, simple feedback may be attained by simply touching a region described with a character string "like" which is not enclosed as a rectangular region.

Reference numeral 904 denotes a comment input area. When the user inputs a comment in a comment input field 921, and presses an add button 922, the Web browser transmits a comment addition request to the cloud service server A 131. Upon reception of the request, the cloud service server A 131 registers the input comment. Thus, when the user accesses the cloud service server A 131 via the Web browser, registered comments like the aforementioned comments 917 and 918 are displayed on the Web browser.

Reference numeral 905 denotes a message input area. When the user inputs a message in a message input field 931 and presses a create button 932, the Web browser transmits a message creation request to the cloud service server A 131. Upon reception of the request, the cloud service server A 131 registers the input message. Thus, when the user accesses the cloud service server A 131 via the Web browser, the created message like the aforementioned message 911 is displayed on the Web browser.

The cloud service server B 132 monitors the message display area 903. For example, when the simple feedback button 914 is pressed for the message 911, the cloud service server B 132 confirms an operation status of the image processing apparatus 101, and comments "print OK", as denoted by reference numerals 917 and 918, using the user name of the image forming apparatus 101 if the image forming apparatus 101 is in a printable state. Also, for example, when the simple feedback button 916 is further pressed for the comment 918, the cloud service server B 132 downloads the electronic file 912. Furthermore, the cloud service server B 132 controls the document processing unit 713 to convert the downloaded file into a format, which is interpretable by the image forming apparatus 101, that is, PDL data, and transmits the converted data to the image forming apparatus 101. Details of this processing will be described later.

<Sequence>

Figure 9:
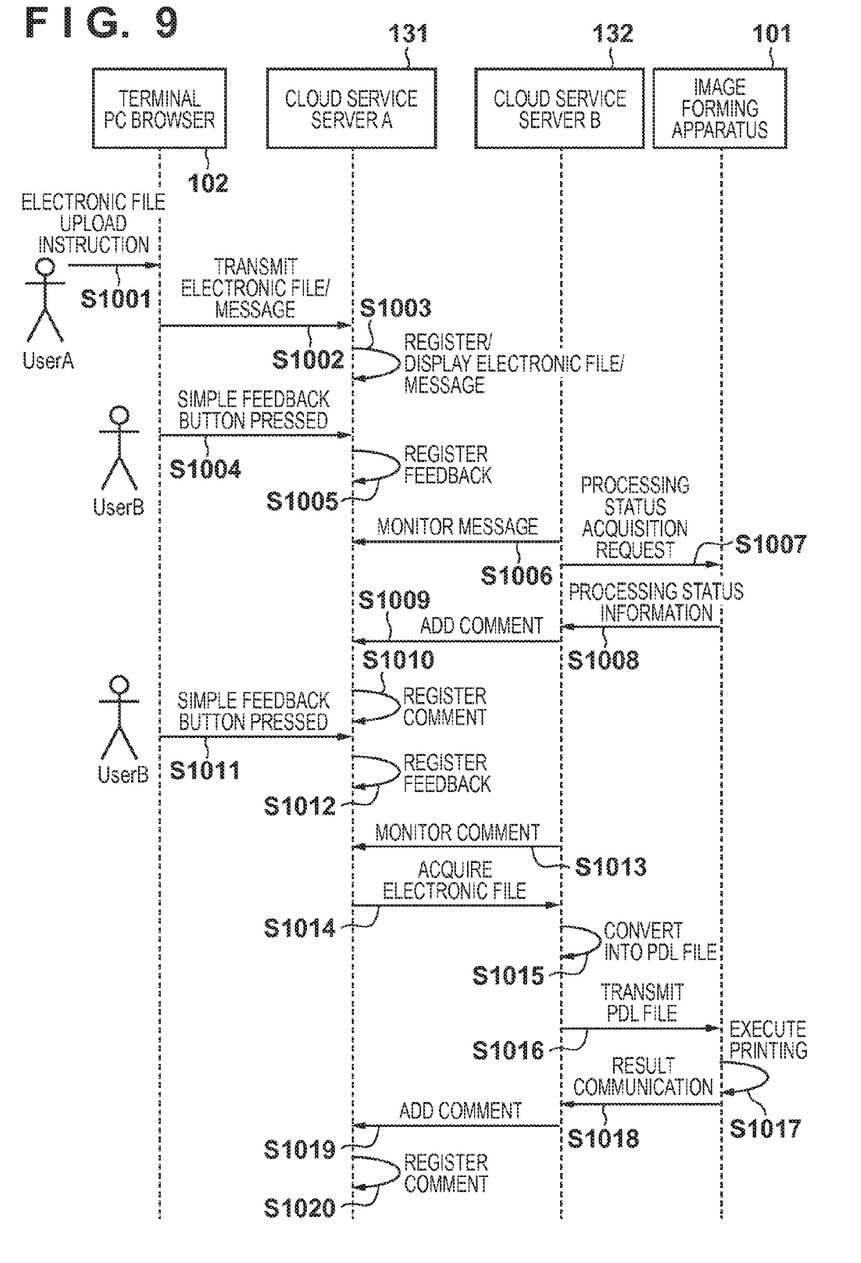
FIG. 9 is a sequence chart for explaining operation required to execute a series of processes.

The processing sequence required for the image forming apparatus 101, cloud service server A 131, and cloud service server B 132 to execute a series of processes in the embodiment of the present invention will be described below with reference to FIG. 9. The processing flowchart will be described later with reference to FIG. 10.

In step S1001, the terminal (operation terminal) 102 accepts a user operation via the Web browser, for example, a electronic file upload instruction. In the electronic file upload instruction, the user designates a electronic file to be uploaded via an interface (operation screen) of the Web browser, and inputs a message character string like the message 911.

In step S1002, the terminal 102 transmits the designated electronic file and input message character string to the cloud service server A 131 based on information input by the user in a electronic file upload instruction 1001. That is, in this step, a message/comment registration request is transmitted to the cloud service server A 131.

In step S1003, the cloud service server A 131 receives the electronic file and message character string transmitted from the terminal 102, and registers the message character string and electronic file in the message DB 502. The microblog function provided by the cloud service server A 131 displays messages and comments in the message DB 502 when the user accesses. For this reason, after completion of the registration in the message DB 502 in step S1003, registered messages and comments are displayed on the screen provided by the microblog function provided by the cloud service server A 131, as shown in FIG. 8.

In step S1004, when the user presses the simple feedback button for the message via the operation screen of the Web browser, the terminal 102 transmits simple feedback information to the cloud service server A 131. Note that the simple feedback information includes operation information indicating a user and a message/comment to which that user fed back. The example of FIG. 8 shows a case in which User B presses the button 914 prepared for the message 911. In FIG. 8, "like" is displayed on the button 914, but a print-related term such as "print instruction", which allows the user to easily understand, may be displayed.

In step S1005, the cloud service server A 131 receives the feedback information transmitted from the terminal 102, and registers this feedback information in simple feedback information of the message DB 502. The feedback information in this case is operation information indicating a user and a message/comment to which that user fed back. In the example of FIG. 8, since User B pressed the button for the message 911, "User B" is registered in the simple feedback information 605 of the message ID 601="M001".

In step S1006, the cloud service server B 132 monitors the message managed by the cloud service server A 131. Subsequently, when simple feedback is made for the message, the cloud service server B 132 transmits a processing status confirmation request to the image forming apparatus 101 in step S1007. In FIG. 9, only one image forming apparatus is connected. However, when a plurality of image forming apparatuses are connected, the cloud service server B 132 transmits a similar request to these image forming apparatuses.

In step S1008, the image forming apparatus 101 notifies the cloud service server B 132 of a processing status as a response. For example, the image forming apparatus 101 notifies the cloud service server B 132 of OK/NG information indicating feasibility of print processing such as "print OK" or "print NG due to paper-out". In step S1009, when the cloud service server B 132 receives OK/NG information indicating "print OK" from the image forming apparatus 101, it transmits a comment character string to the cloud service server A 131. In this case, the image forming apparatus 101 is considered as a user (registered user "MFP_B" or the like), and a character string like the comment 917 is transmitted. That is, the cloud service server B 132 transmits a message/comment registration request to the cloud service server A 131. When a plurality of image forming apparatuses are connected, the cloud service server B 132 transmits a similar character string using another user name (registered user "MFP_C" or the like) like the comment 918.

In step S1010, the cloud service server A 131 registers the received character string as a comment for the message 911 in the message DB 502. The comment 917 is registered to have the message ID 601="M002" and the comment 918 is registered to have the message ID 601="M003". As shown in FIG. 8, the comments 917, 918, and the like are displayed on the A company business negotiation screen 901, and the comments 917 and 918 include the simple feedback button 915 and 916 which allow the user to select an image forming apparatus.

In step S1011, when the user presses the simple feedback button for the comment, the terminal 102 transmits simple feedback information to the cloud service server A 131. Note that the simple feedback information is operation information indicating a user and a message/comment to which that user fed back. The example of FIG. 8 shows a case in which User B pressed the button 916 prepared for the comment 918.

In step S1012, the cloud service server A 131 receives the feedback information (operation information indicating a user and a message/comment to which that user fed back) transmitted from the terminal 102, and registers it in the simple feedback information of the message DB 502. In the example of FIG. 8, since User B pressed the button for the comment 918, "User B" is registered in the simple feedback information 605 of the message ID 601="M003".

In step S1013, the cloud service server B 132 monitors the comment managed by the cloud service server A 131. In step S1014, when simple feedback is made for the comment of the image forming apparatus 101, the cloud service server B 132 downloads the electronic file attached to the original message from the message DB 502 of the cloud service server A 131. That is, the cloud service server B 132 transmits a electronic file download request to the cloud service server A 131. In the example of FIG. 8, a electronic file indicated by the attached file 604 of the original message of the message ID 601="M001" is downloaded. The original message can be confirmed with reference to the related message ID 606.

In step S1015, the cloud service server B 132 converts the electronic file acquired in step S1014 into a PDL file which is interpretable by the image forming apparatus 101. In step S1016, the cloud service server B 132 transmits the PDL file generated in step S1015 to the image forming apparatus 101 together with a print request (or a storage request). The image forming apparatus 101 as a transmission destination at this time is "a user who registered the comment, the simple feedback button of which was pressed in step S1012", that is, a registered user "MFP_C" in the example of FIG. 8.

In step S1017, when the received request is a print request, the image forming apparatus 101 transfers the PDL file to the printer 220 via the control unit 210, and prints the data on a printing medium using the printer 220. On the other hand, when the received request is a storage request, the image forming apparatus 101 stores the PDL file in the print data DB 404 via the control unit 210. In step S1018, the image forming apparatus 101 notifies the cloud service server B 132 of the execution result indicating completion of the print processing (or completion of the storage processing).

In step S1019, the cloud service server B 132 transmits a comment character string indicating that the image forming apparatus 101 executed the print processing to the cloud service server A 131. In the example of FIG. 8, a comment character string like the message ID 601="M004" is transmitted. In step S1020, the cloud service server A 131 registers the received character string as the comment 919 for the comment 918 in the message DB 502. The comment 919 is registered to have the message ID 601="M004".

<Flowchart>

Figure 10:
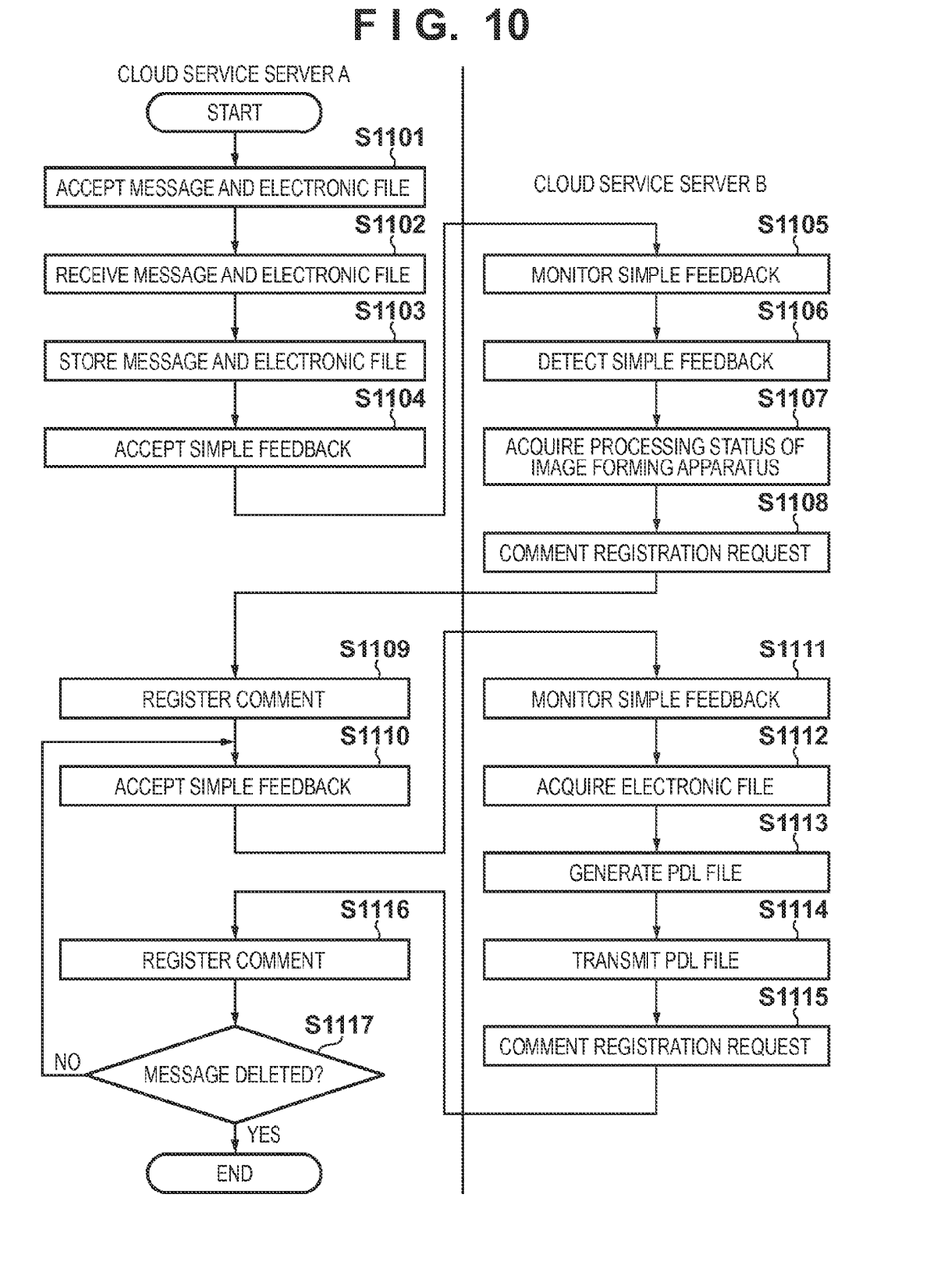
FIG. 10 is a flowchart showing the processing sequence of the cloud service server A 131 and cloud service server B 132.

The processing sequence of the cloud service server A 131 and cloud service server B 132 according to this embodiment will be described below with reference to FIG. 10. FIG. 10 shows processing executed when the cloud service server A 131 registers a message, electronic file, and comments in response to a request from the terminal 102. Also, FIG. 10 shows processing executed when the cloud service server B 132 converts the electronic file into a PDL file to have pressing of the simple feedback button as a trigger, and transmits the PDL file to the image forming apparatus 101. Respective steps to be described below are implemented when the CPU 311 included in the cloud service server A 131 and the CPU included in the cloud service server B 132 execute control programs.

In step S1101, the cloud service server A 131 accepts a request transmitted from the terminal 102 by a user operation at the terminal 102 via the communication unit 511 in the Web application 501. Subsequently, in step S1102, the cloud service server A 131 receives a message and electronic file accepted in step S1101. In step S1103, the cloud service server A 131 stores the received message and electronic file in the message DB 502 in association with each other. In step S1104, the cloud service server A 131 is ready to accept simple feedback for the message.

In step S1105, the cloud service server B 132 monitors the simple feedback registered in the cloud service server A 131. In step S1106, the cloud service server B 132 detects the simple feedback registered for the message monitored in step S1105. If the simple feedback is registered, the cloud service server B 132 acquires a processing status of the image forming apparatus 101 connected via the network in step S1107. For example, the cloud service server B 132 acquires processing status information such as "print OK" or "print NG due to paper-out" from the image forming apparatus 101. If the cloud service server B 132 acquires the processing status information "print OK" in step S1107, it requests the cloud service server A 131 to register a comment indicating that the image forming apparatus 101 is ready to print in step S1108.

In step S1109, the cloud service server A 131 registers the comment received in step S1108 in the message DB 502 as a reply to the message. In step S1110, the cloud service server A 131 is ready to accept simple feedback for the comment registered in step S1109.

In step S1111, the cloud service server B 132 monitors whether or not simple feedback is registered for the comment monitored in step S1105. If simple feedback is detected in step S1111, the cloud service server B 132 acquires the electronic file stored in association with the message monitored in step S1105 from the cloud service server A 131 in step S1112.

In step S1113, the cloud service server B 132 converts the electronic file acquired in step S1112 into a PDL file, which is interpretable by the image forming apparatus 101. In step S1114, the cloud service server B 132 transmits the electronic file generated in step S1113 to the image forming apparatus 101. In step S1115, the cloud service server B 132 requests the cloud service server A 131 to register a comment indicating that the image forming apparatus 101 executed print processing (or storage processing).

In step S1116, the cloud service server A 131 registers the comment received in step S1115 as a reply to the comment registered in step S1109. The cloud service server A 131 confirms in step S1117 whether or not the comment registered in step S1103 is deleted. If the comment is deleted, the processing ends; otherwise, the processes of steps S1110 to S1116 are repetitively executed.

As described above, when a file-attached "message" or "comment is registered using the microblog function, the user can print the attached file by a simple operation, for example, by pressing the simple feedback button. Note that in this embodiment, the cloud service server B 132 monitors the cloud service server A 131, and when simple feedback is made for a message, the cloud service server B 132 receives processing status information from the image forming apparatus 101 and issues a registration request of a comment "print OK". However, the image forming apparatus 101 may directly monitor the cloud service server A 131, may recognize its own processing status, and may issue a registration request of a comment "print OK".

Second Embodiment

The second embodiment of the present invention will be described below. In the first embodiment, the image forming apparatus 101 stores PDL data (step S1017). The second embodiment is different from the first embodiment in this storage processing. Since other processes are the same as those in the first embodiment, a description thereof will not be repeated.

When PDL data is stored in a print data DB 404, a job management unit 402 stores the data in association with a user who issued a storage request, that is, a user who pressed a simple feedback button in step S1011. Also, the job management unit 402 stores the PDL data also in association with a predetermined storage period. Then, the job management unit 402 deletes the PDL data, the storage period of which has elapsed, from the print data DB 404.

On the other hand, the job management unit 402 can accept an authentication request by a login ID and login password input to, for example, a login screen displayed on a screen display unit 400. Upon acceptance of the authentication request, the job management unit 402 transmits an authentication request to a cloud service server B 132 via a communication unit 401.

A control unit 712 receives the authentication request, and passes the login ID and login password included in the authentication request to a user management unit 714. The user management unit 714 searches whether or not user information 800 of a login ID 802 corresponding to the received login ID is managed. If that user information is managed, the user management unit 714 compares the received login password and a login password 803. If the two passwords match, the user management unit 714 determines that the authentication has succeeded, and returns a user ID 801 to the communication unit 401 as a response. After that, the job management unit 402 searches whether or not PDL data stored by a user corresponding to the user ID 801 is stored in the print data DB 404. If the PDL data is stored, the job management unit 402 displays a print target list on the screen display unit 400. That is, a permission is granted to the user to print the PDL data. When the user selects the list and presses a print execution button, the image forming apparatus 101 can print that electronic data.

As described above, when a file-attached "message" or "comment is registered using the microblog function, the user can print the attached file by a simple operation, for example, by pressing the simple feedback button. In addition, since a print job is generated in advance based on a simple feedback for a comment on the microblog function, a print execution speed when print processing is required can be increased.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-261622 filed on Nov. 29, 2012, which is hereby incorporated by reference herein in its entirety.

What is claimed is:

1. An information processing system comprising:
a management unit configured to manage a message registered with print data and comments registered based on a status of each of a plurality of printers, the comments being associated with the message;
an obtaining unit configured to obtain the status of each of the plurality of printers in a network when receiving a first feedback information for the registered message, the first feedback information being received in accordance with selection of a first feedback button associated with the registered message; and
a control unit configured to cause, when receiving a second feedback information for one of the comments managed by said management unit, the printer related to the received second feedback information to print the print data related to the managed message corresponding to the first information feedback button, the second feedback information being received in accordance with selection of one of second feedback buttons associated with each of the managed comments.

2. The system according to claim 1, wherein the first feedback button is displayed together with the message, the second feedback button is displayed together with each comment.

3. The system according to claim 1, further comprising a presentation unit configured to present the comments corresponding to a plurality of printers being capable of printing the print data when receiving the first feedback information.

4. The system according to claim 3, wherein said control unit causes the printer for which then second feedback information is made of the plurality of printable printers presented by said presentation unit to print the print data.

5. The system according to claim 1, further comprising a registration unit configured to register information indicating completion of printing of the print data as a comment for the message managed by the management unit.

6. An information processing apparatus configured to communicate with a server having a function of managing a message registered with print data and comments, being associated with the message, registered based on a status of each of a plurality of printers, comprising:
an obtaining unit configured to obtain the status of each of a plurality of printers in a network when receiving a first feedback information for the message registered with print data, the first feedback information being received in accordance with selection of a first feedback button associated with the registered message; and
a control unit configured to cause, when receiving a second feedback information for one of the comments managed by said management unit, the printer related to the received second feedback information to print the print data related to the managed message corresponding to the first feedback button, the second feedback information being received in accordance with selection of one of second feedback buttons associated with each of the managed comments.

7. The apparatus according to claim 6, wherein the first feedback button is displayed together with a corresponding message, the second feedback button is displayed together with each comment.

8. The apparatus according to claim 6, further comprising a presentation unit configured to present the comments corresponding to a plurality of printers being capable of printing the print data when said receiving unit detects the first feedback information.

9. The apparatus according to claim 8, wherein said control unit causes the printer for which the second feedback information is made of the plurality of printable printers presented by said presentation unit to print the print data.

10. The apparatus according to claim 6, further comprising a registration unit configured to register information indicating completion of printing of the print data as a comment for the managed message.

11. A control method of an information processing system, comprising:
managing a message registered with print data and comments registered based on a status of each of a plurality of printers, the comments being associated with the message;
obtaining the status of each of the plurality of printers in a network when receiving a first feedback information for the registered message, the first feedback information being received in accordance with selection of a first feedback button associated with the registered message; and
causing, when receiving a second feedback information for one of the comments managed by said management unit, the printer related to the received second feedback information to print the print data related to the managed message corresponding to the first feedback button, the second feedback information being received in accordance with selection of one of second feedback buttons associated with each of the managed comments.

12. A control method of an information processing apparatus configured to communicate with a server having a function of managing a message registered with print data and comments, being associated with the message, registered based on a status of each of a plurality of printers, comprising:
obtaining the status of each of a plurality of printers in a network when receiving a first feedback information for the message registered with print data, the first feedback information being received in accordance with selection of a first feedback button associated with the registered message; and
causing, when receiving a second feedback information for one of the comments managed by said management unit, the printer related to the received second feedback information to print the print data related to the managed message corresponding to the first feedback button, the second feedback information being received in accordance with selection of one of second feedback buttons associated with each of the managed comments.

13. A non-transitory computer-readable storage medium storing a computer program for causing a computer to execute a control method for an information processing system, the control method comprising:
- managing a message registered with print data and comments registered based on a status of each of a plurality of printers, the comments being associated with the message;
- obtaining the status of each of the plurality of printers in a network when receiving a first feedback information for the registered message, the first feedback information being received in accordance with selection of a first feedback button associated with the registered message; and
- causing, when receiving a second feedback information for one of the comments managed by said management unit, the printer related to the received second feedback information to print the print data related to the managed message corresponding to the first feedback button, the second feedback information being received in accordance with selection of one of second feedback buttons associated with each of the managed comments.

14. A non-transitory computer-readable storage medium storing a computer program for causing a computer to executed a control method for an information processing apparatus configured to communicate with a server having a function of managing a message registered with print data and comments, being associated with the message, registered based on a status of each of a plurality of printers, the control method comprising:
- obtaining the status of each of a plurality of printers in a network when receiving a first feedback information for the message registered with print data, the first feedback information being received in accordance with selection of a first feedback button associated with the registered message; and
- causing, when receiving a second feedback information for one of the comments managed by said management unit, the printer related to the received second feedback information to print the print data related to the managed message corresponding to the first feedback button, the second feedback information being received in accordance with selection of one of second feedback buttons associated with each of the managed comments.

* * * * *